(12) United States Patent
Linsley et al.

(10) Patent No.: US 8,645,360 B2
(45) Date of Patent: Feb. 4, 2014

(54) PREVIEWING SEARCH RESULTS (75) Inventors: Peter Linsley, San Francisco, CA (US); Kenneth W. Dauber, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/288,859

(22) Filed: Nov. 3, 2011

(65) Prior Publication Data

US 2013/0117258 A1    May 9, 2013

(51) Int. Cl.
*G06F 7/00* (2006.01)
*G06F 17/30* (2006.01)

(52) U.S. Cl.
USPC ........................................................ 707/722

(58) Field of Classification Search
USPC .......................................... 707/722, 780, 769
See application file for complete search history.

(56) References Cited

U.S. PATENT DOCUMENTS

| 2003/0146939 | A1 | 8/2003 | Petropoulos et al. | |
| 2006/0122978 | A1 * | 6/2006 | Brill et al. | 707/3 |
| 2008/0147653 | A1 | 6/2008 | Collier | |
| 2010/0114936 | A1 | 5/2010 | Gupta | |
| 2010/0146012 | A1 | 6/2010 | Beaudreau et al. | |
| 2011/0022635 | A1 * | 1/2011 | Michael et al. | 707/780 |
| 2011/0314052 | A1 * | 12/2011 | Francis et al. | 707/769 |

OTHER PUBLICATIONS

Download from search.yahoo.com on Sep. 30, 2011, 3 pages.
Authorized Officer Cristina Dumitrescu, International Search Report and Written Opinion for Application No. PCT/US2012/059222, mailed Jan. 31, 2013, 9 pages.

* cited by examiner

*Primary Examiner* — Ann Chempakaseril
(74) *Attorney, Agent, or Firm* — Fish & Richardson P.C.

(57) ABSTRACT

Methods, systems, and apparatus, including computer programs encoded on a computer storage medium, for previewing search results. In one aspect, a method includes receiving a query from a client device. One or more image search results are provided to the client device, each of the one or more image search results identifying a corresponding image resource and each of the one or more image search results including an image representation of the corresponding image resource. One or more related queries are provided to the client device, the one or more related queries having been determined to be related to the query, wherein each of the one or more related queries includes a preview image to be displayed at the client device, the preview image representing an image search result responsive to the related query.

27 Claims, 8 Drawing Sheets

PREVIEWING SEARCH RESULTS

BACKGROUND

This specification relates to previewing search results.

Internet search engines provide information about Internet accessible resources, e.g., web pages, images, text documents, multimedia content, that are responsive to a user's search query by returning a set of search results in response to the query. A search result includes, for example, a Uniform Resource Locator (URL) and a snippet of information for resources responsive to a query. Some search engines provide image search results. An image search result can include, for example, a representation of a corresponding image resource and a reference, e.g., a URL, for the corresponding image resource. The representation can be an image reduced in size relative to the corresponding image resource.

SUMMARY

A search system provides image search results, related queries, and preview images for the related queries. The related queries can be displayed on a client device so that when a user selects a related query, the client device displays a hovercard including images responsive to the related query. The related queries can be displayed on a client device so that when a user dismisses a related query, the search system sends a new related query and records the dismissal of the prior related query.

In general, one aspect of the subject matter described in this specification can be embodied in methods that include the actions of receiving a query from a client device; providing one or more image search results to the client device, each of the one or more image search results identifying a corresponding image resource and each of the one or more image search results including an image representation of the corresponding image resource; and providing one or more related queries to the client device, the one or more related queries having been determined to be related to the query, wherein each of the one or more related queries includes a preview image to be displayed at the client device, the preview image representing an image search result responsive to the related query. Other embodiments of this aspect include corresponding systems, apparatus, and computer programs, configured to perform the actions of the methods, encoded on computer storage devices. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. The actions further comprising providing instructions to the client device that when executed by the client device cause the client device to perform operations comprising: determining that a user has made a preliminary selection of a first related query; and displaying a hovercard including one or more hovercard images responsive to the first related query. Displaying the hovercard comprises: sending the first related query to the image search system; and receiving the one or more hovercard images from the image search system; wherein the actions further comprise providing the one or more hovercard images to the client device in response to receiving the first related query. Providing instructions to the client device comprises providing the one or more hovercard images to the client device. The actions further comprise providing to the client device instructions that when executed by the client device cause the client device to perform operations comprising: determining that a user has selected a first related query; sending the first related query to the image search system; receiving a plurality of new image search results responsive to the first related query; and displaying the plurality of new image search results responsive to the first related query instead of the image search results responsive to the query; wherein the actions further comprise receiving the first related query and providing the plurality of new image search results responsive to the first related query. The actions further comprise providing one or more new related queries to the client device, the one or more new related queries being related to the first related query. Providing the one or more related queries to the client device comprises providing instructions to the client device that when executed by the client device cause the client device to perform operations comprising: displaying a first related query with a first preview image for the first related query and a dismissal element; determining that a user selected the dismissal element; and ceasing to display the first related query. The actions further comprise receiving an indication from the client device that the user selected the dismissal element; and storing an association between the query and the first related query as a consequence of receiving the indication that the user selected the dismissal element. The actions further comprise receiving an indication from the client device that the user selected the dismissal element; and providing a new related query for display at the client device.

In general, another aspect of the subject matter described in this specification can be embodied in methods that include the actions of providing a query to an image search system; receiving from the image search system one or more image search results responsive to the query, each of the one or more image search results identifying a corresponding image resource and each of the one or more image search results including an image representation of the corresponding image resource; and receiving one or more related queries from the image search system, each of the one or more related queries having been determined to be related to the query and each of the one or more related queries including a preview image, the preview image being responsive to the respective related query of the one or more related queries; and displaying the one or more image search results responsive to the query and the one or more related queries, including displaying with each of the one or more related query the preview image responsive to the respective related query of the one or more related queries. Other embodiments of this aspect include corresponding systems, apparatus, and computer programs, configured to perform the actions of the methods, encoded on computer storage devices.

These and other embodiments can each optionally include one or more of the following features. The actions further comprise determining that a user has made a preliminary selection of a first related query; and displaying a hovercard including one or more hovercard images responsive to the first related query. Displaying the hovercard comprises: sending the first related query to the image search system; and receiving the one or more hovercard images from the image search system. The actions further comprise receiving the one or more hovercard images from the image search system with the one or more related queries. The actions further comprise determining that a user has selected a first related query; sending the first related query to the image search system;

receiving a plurality of new image search results responsive to the first related query; and displaying the plurality of new image search results responsive to the first related query instead of the image search results responsive to the query. The actions further comprise receiving one or more new related queries and displaying the one or more new related queries with the new images, the one or more new related queries being related to the first related query. The actions further comprise displaying a first related query with a first preview image for the first related query and a dismissal element; determining that a user selected the dismissal element; and ceasing to display the first related query. The actions further comprise sending an indication to the image search system that the user selected the dismissal element.

Particular embodiments of the subject matter described in this specification can be implemented so as to realize one or more of the following advantages. Search results for a related query can be previewed with a preview image of one of the search results. Search results for a related query can be previewed with a hovercard including one or more images responsive to the related query. Previewing search results avoids the need for a full reload of search results to provide an indication of search results that will be returned for a query. Users can dismiss related queries. By dismissing related queries, new related queries can be provided. Users can provide feedback indicating related queries that were not of interest. The feedback can be used in providing related queries to other users. The feedback can also be used in providing image search results.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
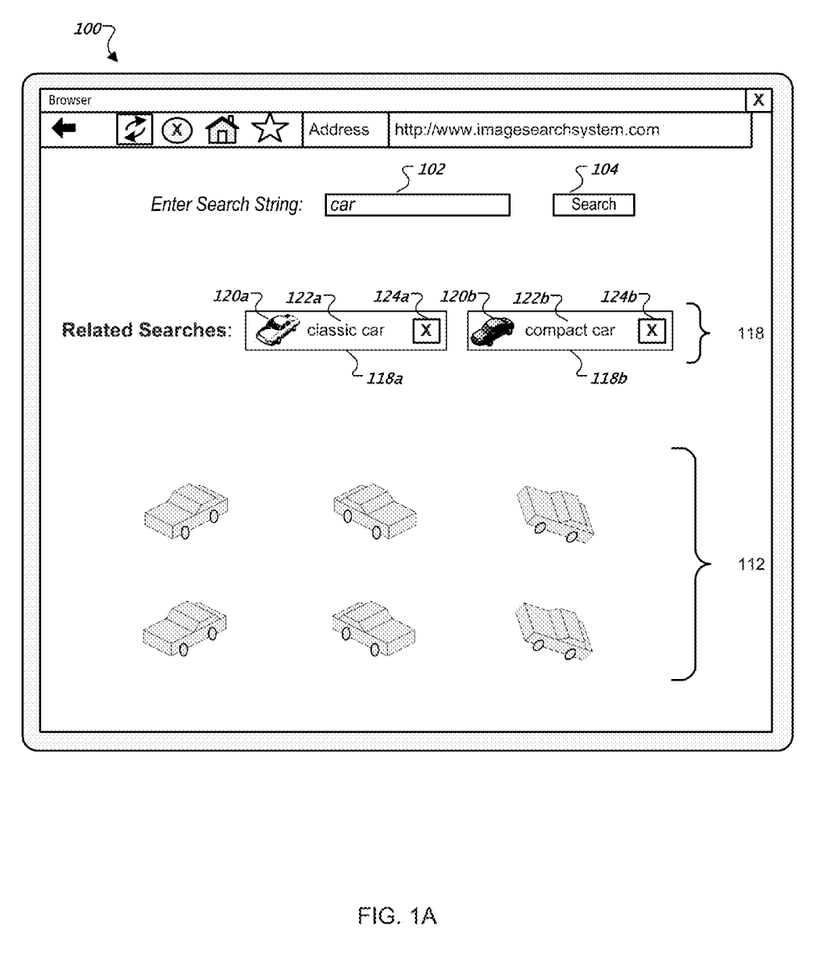
FIG. 1A illustrates a search user interface as displayed in an example graphical user interface (GUI) as displayed in a web browser.

FIG. 1A illustrates a search user interface as displayed in an example graphical user interface (GUI) 100 as displayed in a web browser. The GUI 100 includes a text entry field 102 and a search button 104. When a user enters a query into the text entry field 102 and presses the search button 104, the web browser sends the query to an image search system. The image search system identifies image search results that are responsive to the query in an index of resources and then sends the responsive image search results to the web browser for display. An image search result can include, for example, a representation of a corresponding image resource and a reference, e.g., a URL, for the corresponding image resource. The representation can be an image reduced in size relative to the corresponding image resource.

The image search system also identifies related queries that are related to a submitted query and sends the related queries to the web browser. When a user selects a related query, the web browser sends the related query to the image search system, receives new images responsive to the related query, and displays the new images instead of the old images.

In the example shown in FIG. 1A, a user has entered the query "car," and the web browser is displaying images 112 of cars responsive to the query. The web browser is also displaying related queries 118 "classic car" and "compact car." The related queries 118 are displayed in buttons above the responsive images 112. Each button includes a preview image, text of the related query, and a dismissal box.

For example, a button for a first related query 118a includes the text 122a "classic car," a preview image 120a for the related query, and a dismissal box 124a. A button for a second related query 118b includes a preview image 120b, the text 122b "compact car," and a dismissal box 124b. The preview image 120a for the first related query 118a is an image that is responsive to the first related query 118a. The preview image 120b for the second related query 118b is an image that is responsive to the second related query 118b.

Figure 1B:
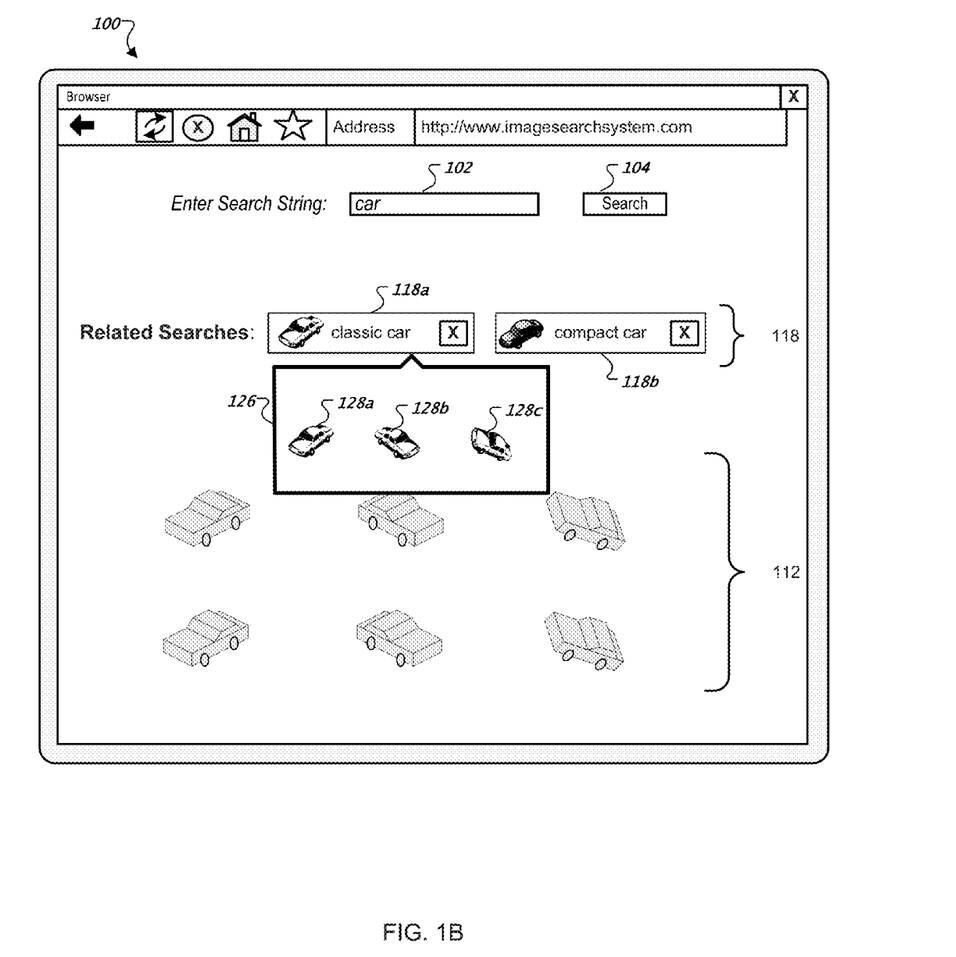
FIG. 1B illustrates an example hovercard for previewing image search results of a related query.

FIG. 1B illustrates an example hovercard 126 for previewing image search results of the first related query 118a. When a user provides input relative to the first related query 118a "classic car," e.g., by moving a cursor over the first related query 118a, the web browser displays the hovercard 126. The hovercard displays images 128a-c that are responsive to the first related query 118a.

The hovercard images 128a-c can be received with the related queries 118 and cached by the web browser so that the web browser need only retrieve the images 128a-c from the cache when the user provides input relative to the first related query 118a. Alternatively, the web browser can, as a result of the user providing input relative to the first related query 118a, send the related query 118a to the image search system with a request for the hovercard images 128a-c.

Figure 1C:
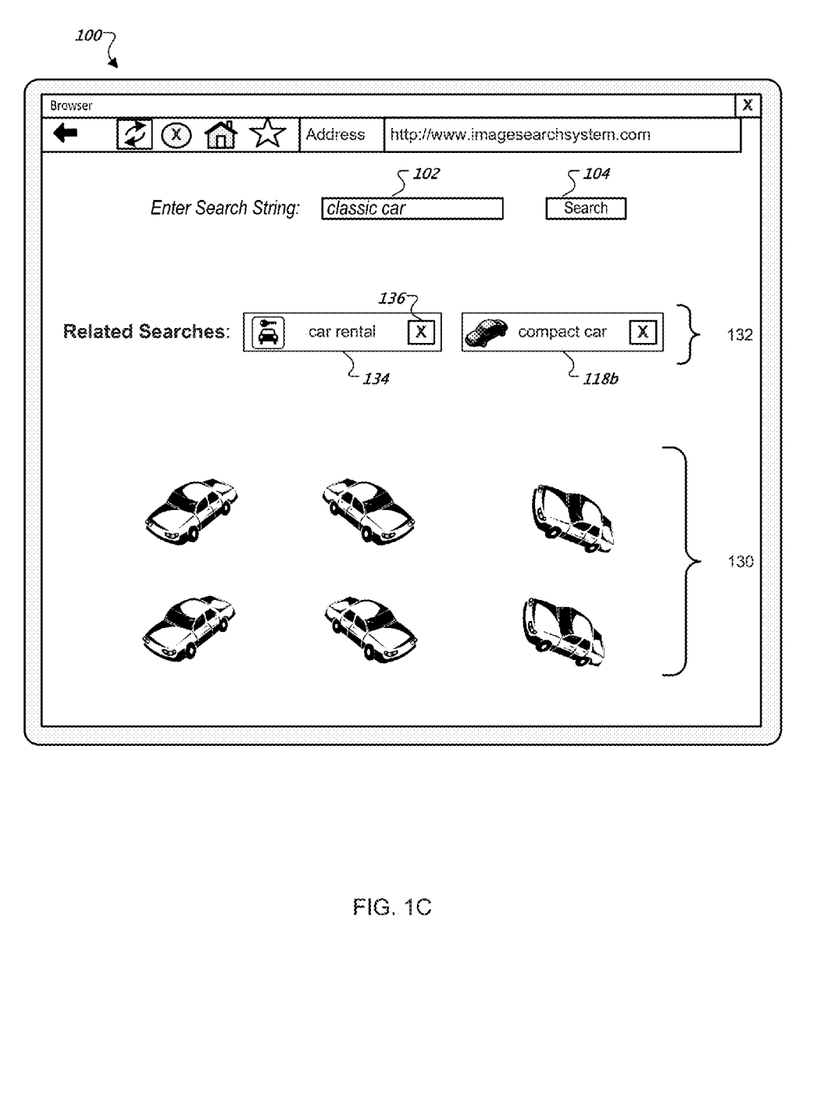
FIG. 1C illustrates the GUI of FIG. 1A after a user has selected the related query "classic car."

FIG. 1C illustrates the GUI 100 after a user has selected the related query "classic car" 118a of FIG. 1A. The web browser sends the related query to the image search system, receives new responsive images 130 and displays the new responsive images 130 instead of the images 112 responsive to the query "car." The web browser also receives new related queries 132 that are related to the query "classic car." The new related query 134 "car rental" includes a dismissal box 136.

Figure 1D:
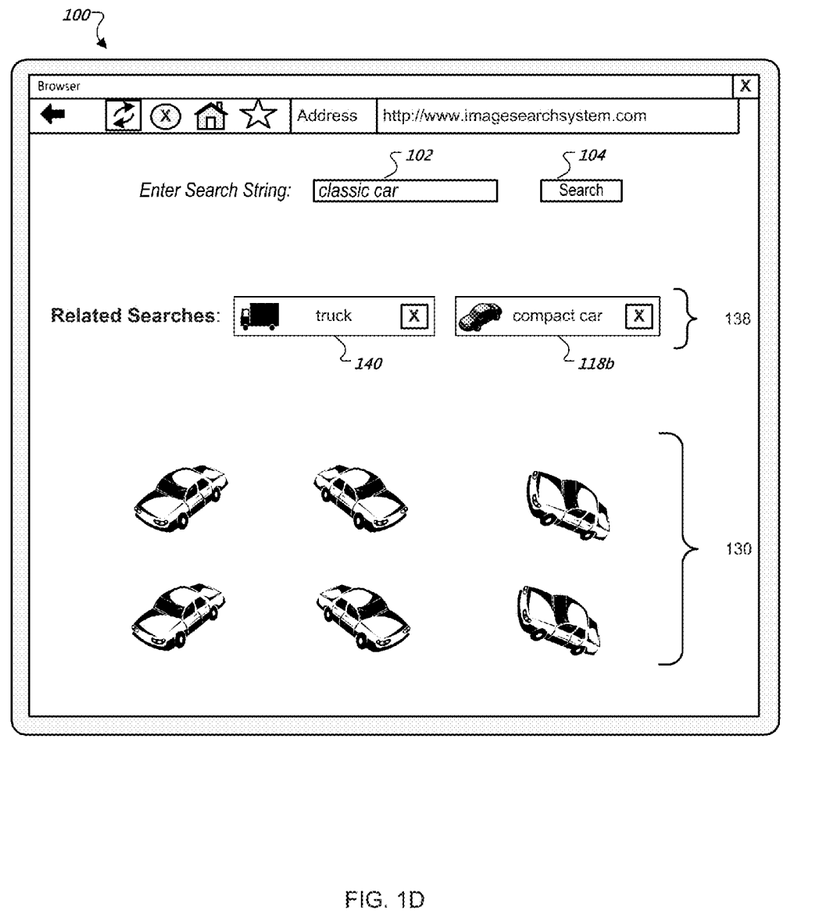
FIG. 1D illustrates the GUI of FIG. 1A after a user has selected the dismissal box of FIG. 1C.

FIG. 1D illustrates the GUI 100 after a user has selected the dismissal box 136 of FIG. 1C. The web browser sends the image search system an indication that the user has selected the dismissal box 136 and receives a new related query 140, "truck." The web browser displays the new related query 140 instead of the related query 134 that was dismissed.

Figure 2:
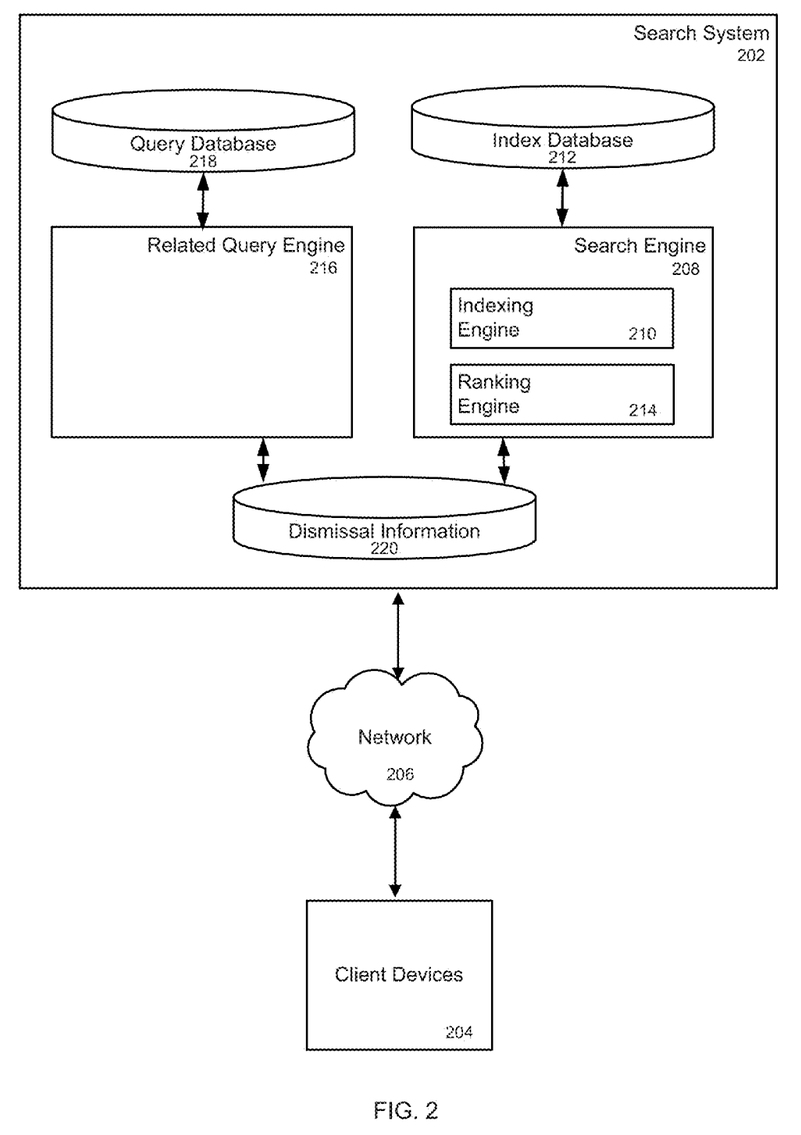
FIG. 2 is a block diagram of an example image search system of one or more computers.

FIG. 2 is a block diagram of an example image search system 202 of one or more computers. The image search system 202 communicates with client devices 204 over a data communication network 206. A user can send search queries to the image search system 202 using a client device 204, e.g., using a web browser on a personal computer or smart phone. The image search system 202 responds by providing image search results to the client device 204, e.g., for display in a web browser. The image search system 202 can also provide related queries to the client device 204 to display with the image search results.

The image search system 202 includes a search engine 208. The search engine 208 identifies image resources responsive to received queries. The search engine 208 includes an indexing engine 210 that crawls a corpus of resources, e.g., the Internet, and indexes the resources. The index information is stored in an index database 212. The index database 212 can include various types of indexes for resources, including keyword-based indexes, location-based indexes, and other indexes. The search engine 208 also includes a ranking engine 214 that ranks resources, e.g., by quality, by relevancy to a query, or both.

The image search system 202 includes a related query engine 216. The related query engine 216 identifies related queries of a received query. For example, the related query engine 216 can identify related queries from a query database 218. The related query engine 216 can identify related queries using any appropriate technique for identifying related queries.

For example, the related queries can be query refinements or query suggestions. A query refinement can be a look-ahead refinement. For example, suppose the image search system 202 receives the query [flower]. The related query engine 216 can identify look-ahead refinements such as [flower+limited to blue images], [flower+limited to red images], [flower+near your location], or [flower+high resolution]. A query suggestion can be a query for a new topic. For example, a query suggestion for a received query can, in some cases, not include the received query.

In another example, a related query can be a query that requests different media for the same query, e.g., videos. In another example, a related query can be a past query submitted by the same user. For instance, a number of past queries that a user interacted with can be displayed with the image search results as related queries.

The image search system 202 provides responsive image search results and related queries to the client device 204. The image search system 202 can also provide preview images for the related queries to be displayed in buttons, e.g., as described above with respect to FIGS. 1A-D. The image search system 202 can send instructions to the client device 204 to display a hovercard including one or more image search results for a related query, e.g., as described above with respect to FIGS. 1A-D. The image search system 202 can send instructions to the client device 204 to display a dismissal box for a related query, e.g., as described above with respect to FIGS. 1A-D.

When the image search system 202 receives an indication from the client device 204 that a user selected a dismissal box, the image search system 202 can store a record, e.g., in a dismissal information repository 220. The record can include an association between the query and related query that was dismissed. The ranking engine 208, the related query engine 216, or both can use the association between the query and the dismissed related query, e.g., for determining which related queries to display for a given query, or for determining image search results for the given query.

In general, a related query that is frequently dismissed when displayed for a given query is not a good related query to display for that given query. A dismissed related query can also provide an indication about the image search results displayed with the dismissed query. For example, suppose a user submits the query [manhattan] and the search engine 208 provides image search results for photographs, art, and maps. The related query engine 216 provides the related query [manhattan map], and the user dismisses that related query. As a result of the dismissed query, the image search system 202 can update the image search results, e.g., to remove some or all of the image search results that are associated with maps and display other image search results instead.

Figure 3A:
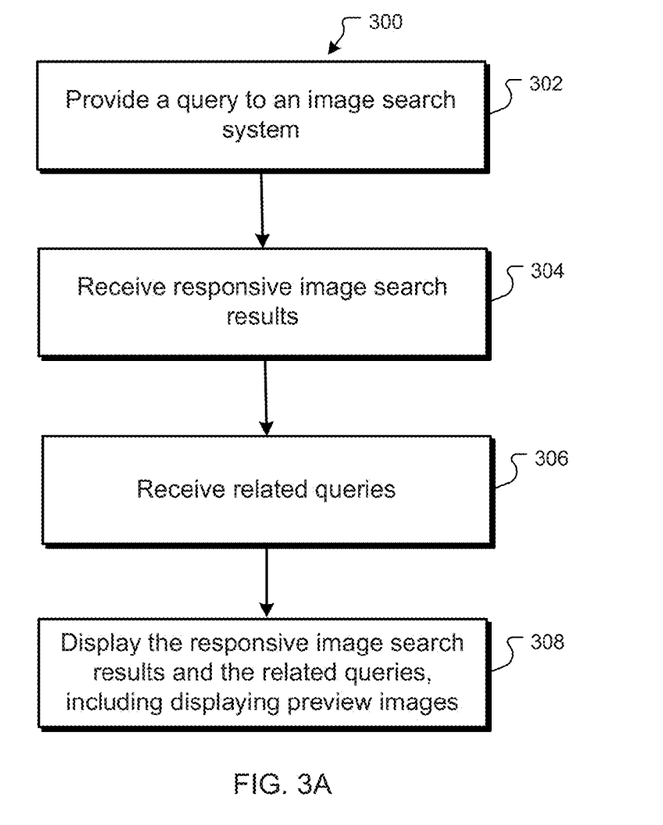
FIG. 3A is a flow diagram of an example process performed by a client device for previewing search results.

FIG. 3A is a flow diagram of an example process 300 performed by a client device for previewing search results. For example, the client device can perform the process by executing a web browser or other application.

The client device provides a query to an image search system (step 302). For example, a user can enter the query into a text entry field of a GUI and select a search button, as described above with respect to FIG. 1A.

The client device receives, from the image search system, one or more image search results responsive to the query (step 304). The client device receives one or more related queries from the image search system, each related query being related to the query (step 306). The client device displays the images responsive to the query and the related queries, including displaying with each related query a preview image responsive to the related query (step 308).

The related queries can be displayed, for example, above the responsive images, to one or more sides of the responsive images, below the images, or amongst the images. For example, the responsive images, related queries, and preview images can be displayed as illustrated in FIG. 1A. In another example, the related queries can be displayed in a text entry box and updated while a user types into the box.

Figure 3B:
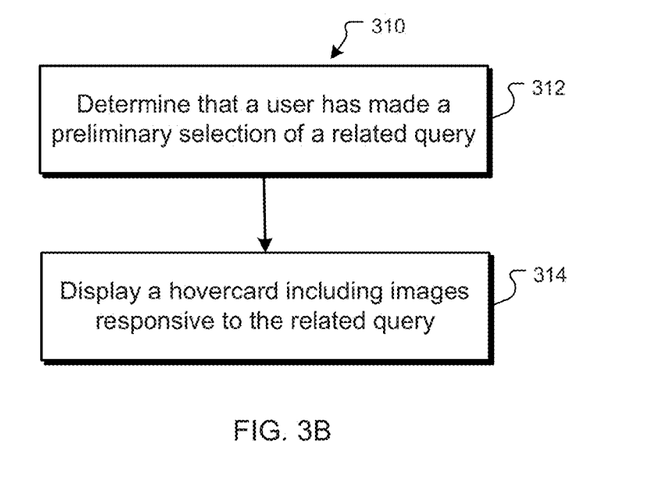
FIG. 3B is a flow diagram of an example process performed by a client device for displaying a hovercard for a related query.

FIG. 3B is a flow diagram of an example process 310 performed by a client device for displaying a hovercard for a related query. The client device determines that a user has made a preliminary selection of a first related query (step 312). For example, the user can move a cursor over a button for the related query, or make a gesture on a touch screen over a button for the related query. The client device displays a hovercard including one or more hovercard images responsive to the first related query (step 314). A hovercard is a user interface element that displays images. The hovercard can be a window, e.g., a pop-up window, an overlay, a tool-tip, or other user interface element that appears over other parts of a displayed GUI. The hovercard can be highlighted or shadowed to draw attention. For example, the hovercard can be displayed as illustrated in FIG. 1B.

For example, the client device can, as a consequence of determining that the user made the preliminary selection, send the first related query to the image search system and receive the hovercard images from the image search system. In another example, the client device can receive the hovercard images when the related queries are received, e.g., in step 306. In that example, the client device can cache the hovercard images for display when the user makes the preliminary selection.

Figure 3C:
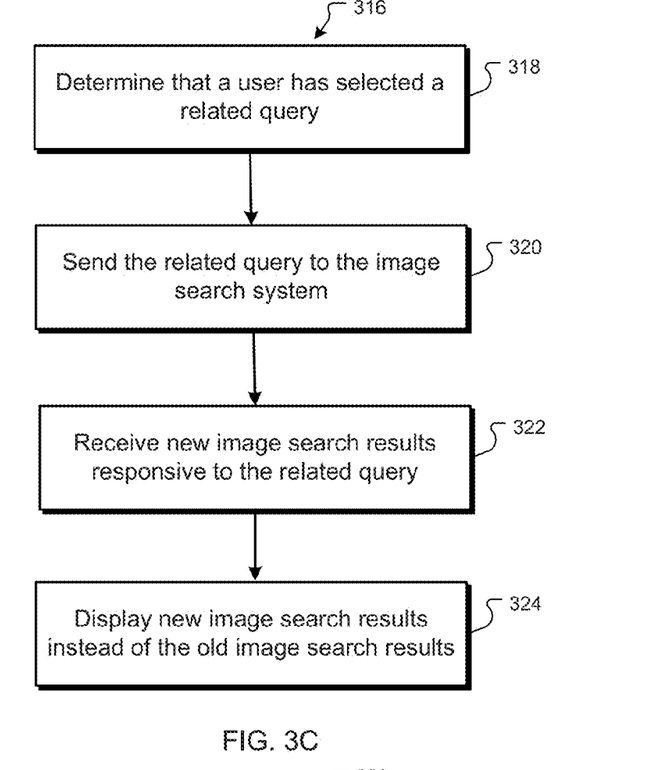
FIG. 3C is a flow diagram of an example process performed by a client device for performing a reload of image search results.

FIG. 3C is a flow diagram of an example process 316 performed by a client device for performing a reload of image search results. The client device determines that a user has selected a first related query (step 318). For example, the user can click on a button displaying the first related query. The client device sends the first related query to the image search system (step 320). The client device receives one or more new image search results responsive to the first related query (step 322). The client device displays the new image search results responsive to the first related query instead of the image search results responsive to the query (step 324). For example, the client device can display the new image search results as illustrated in FIG. 1C. The client device can receive one or more new related queries and display the new related queries with the new image search results, the new related queries being related to the first related query.

Figure 3D:
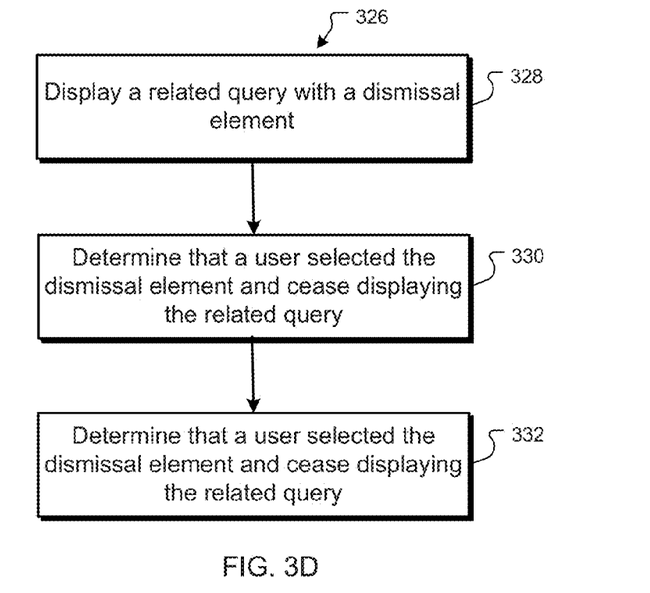
FIG. 3D is a flow diagram of an example process for displaying a dismissal element for a related query.

FIG. 3D is a flow diagram of an example process 326 for displaying a dismissal element for a related query. The client device displays a first related query with a first preview image for the first related query and a dismissal element (step 328). For example, the client device can display a dismissal box as illustrated in FIG. 1C. The client device determines that a user selected the dismissal element (step 330). The client device ceases to display the first related query (step 332). For example, the user can click on the dismissal element. The client device can send an indication to the image search system that the user selected the dismissal element. The client device can receive a new related query to display instead of the first related query. For example, the client device can display a new related query as illustrated in FIG. 1D.

Figure 4:
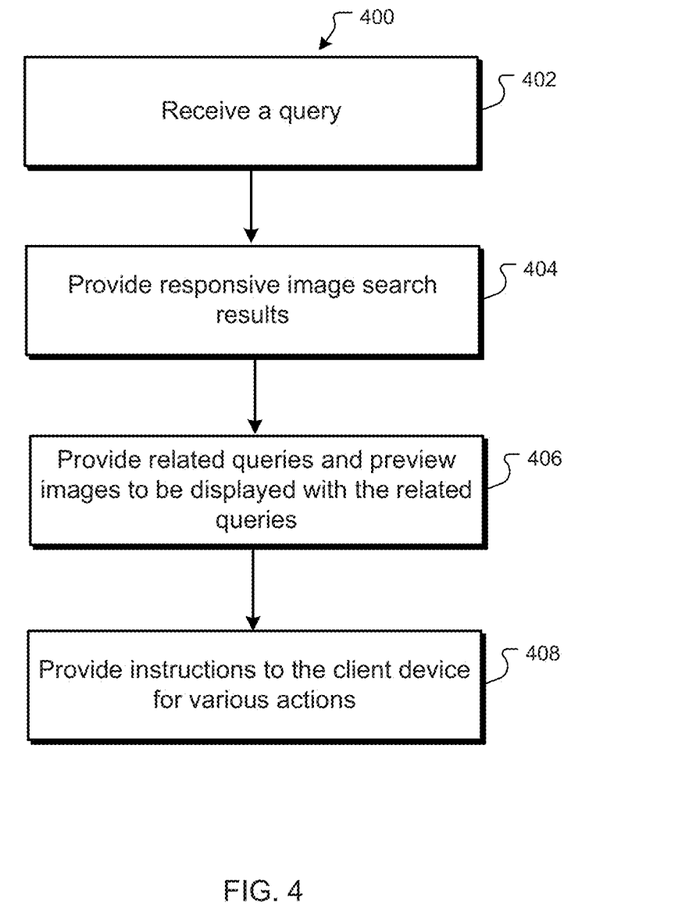
FIG. 4 is a flow diagram of an example process performed by an image search system for previewing search results.

FIG. 4 is a flow diagram of an example process 400 performed by an image search system for previewing search results. The image search system can be a system of one or more computers including, for example, the image search system 202 of FIG. 2.

The system receives a query from a client device (step 402). The system provides image search results responsive to the query to the client device (step 404). The system can use any appropriate technique for identifying responsive image search results. The system provides one or more related queries to the client device and preview images to be displayed with the related queries (step 406). The related queries are related to the query. The system can use any appropriate technique for identifying related queries. Each preview image is responsive to a respective related query. For example, the preview image for a given related query can be the top ranked responsive image for the given related query. The preview images can be reduced in size relative to the original responsive images.

The system can optionally provide instructions to the client device for various actions (step 408). The instructions can be, for example, a script embedded in a web page.

For example, the system can provide instructions to the client device that when executed by the client device cause the client device to display a hovercard, as described above with respect to FIG. 3B. In that case, the system can provide the hovercard images with the related queries, or later after receiving a request from the client device for the hovercard images.

In another example, the system can provide to the client device instructions that when executed by the client device cause the client device to reload image search results as described above with respect to FIG. 3C. In that case, the system can receive the related query and provide the new image search results.

In another example, system can provide to the client device instructions for displaying a related query with a dismissal element, e.g., as described above with respect to FIG. 3D. In that case, the system can receive an indication from the client device that a user selected the dismissal element and store an association between the query and the dismissed related query as a consequence of receiving the indication that the user selected the dismissal element. The system can provide a new related query for display at the client device, e.g., as described above with respect to FIG. 1D.

The above examples described with respect to FIGS. 1A-D, 2, 3A-D, and 4 have illustrated previewing image search results at a client device. The same techniques can also be used for previewing other types of search results, e.g., video search, news search, or web search. For example, a general search service can provide buttons for related queries as described above, e.g., so that a user selecting a related query receives image search results for the related query even though the initial query was provided to the general search service.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media, e.g., multiple CDs, disks, or other storage devices.

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program, also known as a program, software, software application, script, or code, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network, e.g., the Internet, and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a client device, e.g., for purposes of displaying data to and receiving user input from a user interacting with the client device. Data generated at the client device, e.g., a result of the user interaction, can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by an image search system of one or more computers, the method comprising:
   receiving a query from a client device;
   providing one or more image search results to the client device, each of the one or more image search results identifying a corresponding image resource and each of the one or more image search results including an image representation of the corresponding image resource;
   providing one or more related queries to the client device, the one or more related queries having been determined to be related to the query, wherein each of the one or more related queries includes a respective plurality of preview images, each preview image representing an image search result responsive to the related query; and providing instructions to the client device that when executed by the client device cause the client device to perform operations comprising:

displaying the one or more image search results;

displaying the one or more related queries, wherein displaying the one or more related queries includes:

displaying a first related query with a first preview image for the first related query and a first dismissal element for the first related query; and displaying a second related query with a second preview image for the second related query and a second dismissal element for the second related query;

determining that a user has made a preliminary selection of the first related query;

in response to determining that the user has made the preliminary selection of the first related query, displaying a hovercard in proximity to the first related query, including displaying the respective plurality of preview images for the first related query within the hovercard;

determining that the user has selected the second dismissal element; and in response to determining that the user has selected the second dismissal element, ceasing to display the second related query and the second preview image.

2. The method of claim 1, further comprising providing to the client device instructions that when executed by the client device cause the client device to perform operations comprising:

determining that the user has selected the first related query;

sending the first related query to the image search system;

receiving a plurality of new image search results responsive to the first related query; and displaying the plurality of new image search results responsive to the first related query instead of the image search results responsive to the query;

wherein the method performed by the image search system further comprises receiving the first related query and providing the plurality of new image search results responsive to the first related query.

3. The method of claim 2, further comprising providing one or more new related queries to the client device, the one or more new related queries being related to the first related query.

4. The method of claim 1, further comprising:

receiving an indication from the client device that the user selected the second dismissal element; and storing an association between the query and the second related query as a consequence of receiving the indication that the user selected the second dismissal element.

5. The method of claim 1, further comprising:

receiving an indication from the client device that the user selected the second dismissal element; and providing a new related query related to the query, with a new preview image for the new related query and a new dismissal element for the new related query, for display at the client device, in place of the second related query ceased to display.

6. A method performed by a client device, the method comprising:

providing a query to an image search system;

receiving from the image search system one or more image search results responsive to the query, each of the one or more image search results identifying a corresponding image resource and each of the one or more image search results including an image representation of the corresponding image resource;

receiving one or more related queries from the image search system, each of the one or more related queries having been determined to be related to the query and each of the one or more related queries including a respective plurality of preview images, each preview image being responsive to the respective related query of the one or more related queries;

displaying the one or more image search results responsive to the query and the one or more related queries, wherein displaying the one or more related queries includes displaying a first related query with a first preview image for the first related query and a first dismissal element for the first related query and a second related query with a second preview image for the second related query and a second dismissal element for the second related query;

determining that the user has made a preliminary selection of the first related query;

in response to determining that the user has made the preliminary selection of the first related query, displaying a hovercard in proximity to the first related query, including displaying the respective plurality of preview images for the first related query within the hovercard;

determining that the user has selected the second dismissal element; and in response to determining that the user has selected the second dismissal element, ceasing to display the second related query and the second preview image.

7. The method of claim 6, further comprising:

determining that the user has selected the first related query;

sending the first related query to the image search system;

receiving a plurality of new image search results responsive to the first related query; and displaying the plurality of new image search results responsive to the first related query instead of the image search results responsive to the query.

8. The method of claim 7, further comprising receiving one or more new related queries and displaying the one or more new related queries with the new images, the one or more new related queries being related to the first related query.

9. The method of claim 6, further comprising sending an indication to the image search system that the user selected the second dismissal element.

10. An image search system comprising one or more processors and a memory, the image search system being configured to perform actions comprising:

receiving a query from a client device;

providing one or more image search results to the client device, each of the one or more image search results identifying a corresponding image resource and each of the one or more image search results including an image representation of the corresponding image resource;

providing one or more related queries to the client device, the one or more related queries having been determined to be related to the query, wherein each of the one or more related queries includes a respective plurality of preview images, each preview image representing an image search result responsive to the related query; and providing instructions to the client device that when executed by the client device cause the client device to perform operations comprising:

displaying the one or more image search results;
displaying the one or more related queries, wherein displaying the one or more related queries includes:
 displaying a first related query with a first preview image for the first related query and a first dismissal element for the first related query; and
 displaying a second related query with a second preview image for the second related query and a second dismissal element for the second related query;
determining that a user has made a preliminary selection of the first related query;
in response to determining that the user has made the preliminary selection of the first related query, displaying a hovercard in proximity to the first related query, including displaying the respective plurality of preview images for the first related query within the hovercard;
determining that the user has selected the second dismissal element; and
in response to determining that the user has selected the second dismissal element, ceasing to display the second related query and the second preview image.

11. The image search system of claim 10, the actions further comprising providing to the client device instructions that when executed by the client device cause the client device to perform operations comprising:
determining that the user has selected the first related query;
sending the first related query to the image search system;
receiving a plurality of new image search results responsive to the first related query; and
displaying the plurality of new image search results responsive to the first related query instead of the image search results responsive to the query;
wherein the method performed by the image search system further comprises receiving the first related query and providing the plurality of new image search results responsive to the first related query.

12. The image search system of claim 11, the actions further comprising providing one or more new related queries to the client device, the one or more new related queries being related to the first related query.

13. The image search system of claim 11, the actions further comprising:
receiving an indication from the client device that the user selected the second dismissal element; and
storing an association between the query and the second related query as a consequence of receiving the indication that the user selected the second dismissal element.

14. The image search system of claim 11, the actions further comprising:
receiving an indication from the client device that the user selected the second dismissal element; and
providing a new related query related to the query, with a new preview image for the new related query and a new dismissal element for the new related query, for display at the client device, in place of the second related query ceased to display.

15. A client device comprising one or more processors and a memory, the client device being configured to perform actions comprising:
providing a query to an image search system;
receiving from the image search system one or more image search results responsive to the query, each of the one or more image search results identifying a corresponding image resource and each of the one or more image search results including an image representation of the corresponding image resource;
receiving one or more related queries from the image search system, each of the one or more related queries having been determined to be related to the query and each of the one or more related queries including a respective plurality of preview images, each preview image being responsive to the respective related query of the one or more related queries;
displaying the one or more image search results responsive to the query and the one or more related queries, wherein displaying the one or more related queries includes displaying a first related query with a first preview image for the first related query and a first dismissal element for the first related query and a second related query with a second preview image for the second related query and a second dismissal element for the second related query;
determining that the user has made a preliminary selection of the first related query;
in response to determining that the user has made the preliminary selection of the first related query, displaying a hovercard in proximity to the first related query, including displaying the respective plurality of preview images for the first related query within the hovercard;
determining that the user has selected the second dismissal element; and
in response to determining that the user has selected the second dismissal element, ceasing to display the second related query and the second preview image.

16. The client device of claim 15, the actions further comprising:
determining that the user has selected the first related query;
sending the first related query to the image search system;
receiving a plurality of new image search results responsive to the first related query; and
displaying the plurality of new image search results responsive to the first related query instead of the image search results responsive to the query.

17. The client device of claim 16, the actions further comprising receiving one or more new related queries and displaying the one or more new related queries with the new images, the one or more new related queries being related to the first related query.

18. The client device of claim 15, the actions further comprising sending an indication to the image search system that the user selected the dismissal element.

19. A non-transitory computer storage medium encoded with a computer program, the program comprising instructions that when executed by one or more computers cause the one or more computers to perform actions comprising:
receiving a query from a client device;
providing one or more image search results to the client device, each of the one or more image search results identifying a corresponding image resource and each of the one or more image search results including an image representation of the corresponding image resource;
providing one or more related queries to the client device, the one or more related queries having been determined to be related to the query, wherein each of the one or more related queries includes a respective plurality of preview images, each preview image representing an image search result responsive to the related query; and
providing instructions to the client device that when executed by the client device cause the client device to perform operations comprising:

displaying the one or more image search results;
displaying the one or more related queries, wherein displaying the one or more related queries includes:
displaying a first related query with a first preview image for the first related query and a first dismissal element for the first related query; and
displaying a second related query with a second preview image for the second related query and a second dismissal element for the second related query;
determining that a user has made a preliminary selection of the first related query;
in response to determining that the user has made the preliminary selection of the first related query, displaying a hovercard in proximity to the first related query, including displaying the respective plurality of preview images for the first related query within the hovercard;
determining that the user has selected the second dismissal element; and
in response to determining that the user has selected the second dismissal element, ceasing to display the second related query and the second preview image.

20. The computer storage medium of claim 19, the actions further comprising providing to the client device instructions that when executed by the client device cause the client device to perform operations comprising:
determining that the user has selected the first related query;
sending the first related query to the image search system;
receiving a plurality of new image search results responsive to the first related query; and
displaying the plurality of new image search results responsive to the first related query instead of the image search results responsive to the query;
wherein the method performed by the image search system further comprises receiving the first related query and providing the plurality of new image search results responsive to the first related query.

21. The computer storage medium of claim 20, the actions further comprising providing one or more new related queries to the client device, the one or more new related queries being related to the first related query.

22. The computer storage medium of claim 19, the actions further comprising:
receiving an indication from the client device that the user selected the second dismissal element; and
storing an association between the query and the second related query as a consequence of receiving the indication that the user selected the second dismissal element.

23. The computer storage medium of claim 19, the actions further comprising:
receiving an indication from the client device that the user selected the second dismissal element; and
providing a new related query related to the query, with a new preview image for the new related query and a new dismissal element for the new related query, for display at the client device, in place of the second related query ceased to display.

24. A non-transitory computer storage medium encoded with a computer program, the program comprising instructions that when executed by one or more computers cause the one or more computers to perform actions comprising:
providing a query to an image search system;
receiving from the image search system one or more image search results responsive to the query, each of the one or more image search results identifying a corresponding image resource and each of the one or more image search results including an image representation of the corresponding image resource;
receiving one or more related queries from the image search system, each of the one or more related queries having been determined to be related to the query and each of the one or more related queries including a respective plurality of preview images, each preview image being responsive to the respective related query of the one or more related queries;
displaying the one or more image search results responsive to the query and the one or more related queries, wherein displaying the one or more related queries includes displaying a first related query with a first preview image for the first related query and a first dismissal element for the first related query and a second related query with a second preview image for the second related query and a second dismissal element for the second related query;
determining that the user has made a preliminary selection of the first related query;
in response to determining that the user has made the preliminary selection of the first related query, displaying a hovercard in proximity to the first related query, including displaying the respective plurality of preview images for the first related query within the hovercard;
determining that the user has selected the second dismissal element; and
in response to determining that the user has selected the second dismissal element, ceasing to display the second related query and the second preview image.

25. The computer storage medium of claim 24, the actions further comprising:
determining that the user has selected the first related query;
sending the first related query to the image search system;
receiving a plurality of new image search results responsive to the first related query; and
displaying the plurality of new image search results responsive to the first related query instead of the image search results responsive to the query.

26. The computer storage medium of claim 25, the actions further comprising receiving one or more new related queries and displaying the one or more new related queries with the new images, the one or more new related queries being related to the first related query.

27. The computer storage medium of claim 24, the actions further comprising sending an indication to the image search system that the user selected the second dismissal element.

* * * * *